March 15, 1960

J. BOEHLER 2,928,520

COOKY SANDWICH DIVIDING, COUNTING AND GROUPING MACHINE

Filed Feb. 12, 1958

INVENTOR.
JOSEPH BOEHLER
BY
ATTORNEYS

Fig. 2

INVENTOR.
JOSEPH BOEHLER

March 15, 1960     J. BOEHLER     2,928,520
COOKY SANDWICH DIVIDING, COUNTING AND GROUPING MACHINE
Filed Feb. 12, 1958     6 Sheets-Sheet 6

INVENTOR.
JOSEPH BOEHLER

United States Patent Office 2,928,520
Patented Mar. 15, 1960

2,928,520

COOKY SANDWICH DIVIDING, COUNTING AND GROUPING MACHINE

Joseph Boehler, Skokie, Ill., assignor to Peters Machinery Company, Chicago, Ill., a corporation of Illinois Application February 12, 1958, Serial No. 714,911

8 Claims. (Cl. 198—31)

This invention relates in general to a cooky sandwich dividing, counting and grouping machine and more particularly to novel mechanisms for dividing, counting and grouping sandwich cookies in conjunction with a cooky sandwich assembly machine.

Generally, described, the cooky sandwich dividing, counting and grouping machine of the present invention comprises means for attaching same to and receiving its power from a cooky sandwich assembly machine; whereby the cookies are automatically deposited upon a conveyor strip, filling material such as crème is deposited upon each of the cookies, a second cooky is assembled to each of the cookies coated with the filling to form completed sandwiches, the sandwiches being conveyed therefrom by chain type means to the dividing and counting machine where they are divided into groups of a desired number, after which they are carried by an endless belt to places and means for automatic packaging the same in suitable containers available to the consumers.

A primary object of this invention is to provide a machine capable of receiving a plurality of rows of cooky sandwiches, said machine embodying means to count the cooky sandwiches and divide them into separate rows of equal number, and/or if so desired to alternate the cookies by deflecting the cooky sandwiches, one cooky sandwich in one row and a second cooky sandwich in a second row, after which they are stacked and conveyed away for packaging as desired.

A still further object of the invention is to provide a novel means for receiving completed cooky sandwiches from the cooky sandwich assembly conveyor means, chain type means conveying the sandwiches along as flat objects on a conveyor strip to spring actuating means controlled by an oscillating means to index the sandwiches into groups of desired numbers for stacking and packaging.

A still further object of the invention is to provide a novel means for receiving completed cooky sandwiches from the cooky sandwich assembly conveyor means, chain type means conveying the sandwiches along as flat objects on a conveyor strip to spring actuating means controlled by a continuously rotating means to alternately index the sandwiches into rows of the same number but in staggered relation with each other in adjacent rows.

A further object of the invention is the provision of novel synchronizing means whereby all of the moving parts are actuated in timed relation with each other in accordance with some desired circumstances or condition.

Another and more specific object of the invention is the provision of a demountable arm connected to a cam actuated lever, and an auxiliary chain, whereby the arm may be removed from the machine parts and the chain assembled to suitable sprockets upon the machine, thereby effecting the indexing of the sandwiches conveyed in rows into groups of sandwiches, or rows of sandwiches suitably spaced from each other.

And another object of the invention is to provide a novel support means assembled between a plurality of rows of sandwich chain conveyors and comprising a plurality of leaf springs, the springs being assembled so that they normally extend out into the path of upwardly extending pins carried by the chain conveyors adjacent thereto but readily moved by the pins and when released by the pins will resiliently snap back to their normal location and in so doing will strike and deflect any cooky sandwich in its path, and means associated therewith to control location and actuation of the leaf springs.

And still another object of the invention is to provide a novel adjustable support assembled between two rows of sandwich chain conveyors with upstanding pin-like means assembled therewith, a plurality of leaf springs horizontally assembled with said support whereby the free ends of the springs normally extend outwardly at an angle away from each other into the path of the moving chain conveyor and the conveyor pin-like means assembled thereto, but readily moved thereby and when released therefrom will resiliently snap back to its normal position if not held stationary by an additional cam shaped means, and when freely released the springs will automatically strike and deflect any cooky sandwich in its path onto an adjoining movable chain conveyor arranged parallel therewith whereby four rows of cooky sandwiches may be grouped and conveyed by four chain conveyors, the sandwiches being either in groups of a suitable number of arranged in alternate locations according to control of the movement of said additional cam shaped means.

And still a further object of the invention is to provide a novel adjustable support for assembly between two lines of movable conveyors, two leaf springs assembled with said support and horizontally spaced from each other in a vertical plane whereby the free ends of the springs normally extend outwardly from the support and further away from each other, each spring being flexible and movable horizontally across the top of the adjacent chain conveyor; the pin-like means on the moving chain conveyors suitably arranged for moving the springs toward each other, said springs when released by said pin-like means as the conveyor moves away will snap to their normal positions, the springs having a movable and adjustable wedge shaped object assembled therewith whereby movement thereof will cause said springs to extend further apart from each other when in original position, thereby increasing the biasing power of the springs when moved towards each other by pins on the conveyors and providing a more powerful snap action to each spring when released from the pins.

Other objects and advantages, more or less ancillary of the foregoing in the manner in which all the various objects are realized will appear in the following description in accompanying drawings wherein there is assembled and pointed out certain details of structure and aggroupment of parts connotative of the scope of the invention.

Referring to the drawings, there is disclosed therein a cooky sandwich machine attached to a cooky assembly machine coordinating together for receiving, counting, dividing and conveying cooky sandwiches.

Briefly, the cooky sandwich dividing and counting machine 20 of this invention includes means for attachment to and means for receiving power from a cooky sandwich assembly machine 21.

Figure 1:
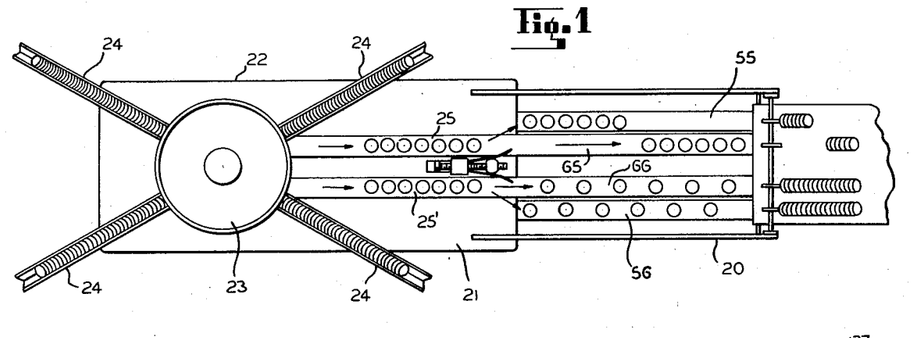
Figure 1 is a diagrammatic plan view of a cooky sandwich dividing, counting and grouping machine, assembled with a cooky sandwich assembly machine, constructed according to this invention.

The cooky sandwich assembly machine 21 includes a main frame 22 supporting a crème hopper 23, a plurality of cookie troughs 24 and a plurality of cooky sandwich chain conveyors 25 and 25'. An electric motor 26 is mounted upon the lower frame section of said assembly machine 21, said motor having a common drive shaft 27 and chain sprocket 28 mounted thereon. The cooky sandwich dividing and counting machine 20 has a common drive shaft 30 mounted in suitable bearings and supported at one end thereof. Shaft 30 carries a sprocket 31 at one end thereof and is connected by means of the sprocket chain 33 to said sprocket 28 on drive shaft 27.

Figure 2:
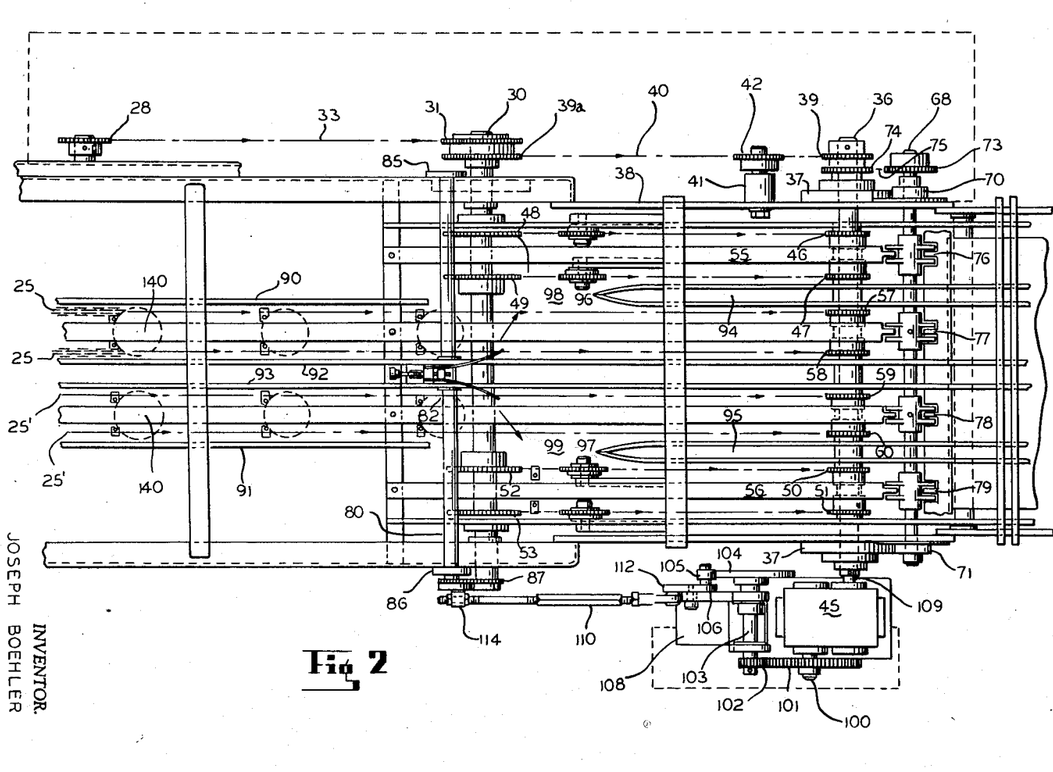
Figure 2 is a fragmentary plan view of the upper section of the cooky sandwich dividing, counting and grouping machine attached to a plurality of chain conveyors associated with the cooky sandwich assembly machine not shown.

Referring now more particularly to the cooky sandwich dividing and counting machine, as shown by Figures 2, 3, 4 and 11, it will be noted that the main frame 35 of said machine supports a plurality of shafts arranged in suitable bearings, the shafts extending horizontally and transversely of the machine. The main power motor shaft 27 drives shaft 30 through the intermediation of chain 33 and sprockets 28 and 31, whereby the moving parts of the dividing and counting machine 20 are actuated in timed relation with each other by suitable control members associated therewith. A shaft 36 is supported by suitable bearings 37 assembled with the side rails 38 of said dividing and counting machine 20, said shaft 36 extending horizontally and transversely near the rear end portion of said machine 20, as shown by Figure 2. Shaft 36 extends beyond the side walls of the machine 20 and has a sprocket 39 secured to one end thereof and in alignment with sprocket 39a assembled upon shaft 30 adjacent sprocket 31. A chain 40 is trained over said sprocket 39 and 39a for driving said shaft 36. An adjustable chain tightening unit 41 is mounted upon the side wall of said machine 20 with a sprocket shaft and a sprocket 42 assembled for contacting said chain for removing any undesirable slack in the chain 40.

The opposite end of the drive shaft 36 is assembled by suitable means to a counting gear reducing unit 45, its use to be described later. Shaft 30 has a pair of idler sprockets 48 and 49, and shaft 36 has a pair of sprockets 46 and 47 mounted thereon and arranged at a distance from the center line of said machine 20 for driving the outer conveyor chain unit 55 and for conveying cooky sandwiches. The sprockets 46 and 47 mounted adjacent each other are rigidly secured to said shaft 36 for driving the idler sprockets 48 and 49 suitably mounted upon said shaft 30. Shaft 30 also has a pair of idler sprockets 52 and 53 and shaft 36 also has a pair of sprockets 50 and 51 mounted thereon and arranged at the opposite side of the machine and at a distance from the center line of the machine 20 for driving conveyor 56 and for conveying cooky sandwiches. The sprockets 50 and 51 are rigidly secured to said shaft 36 for driving the idler sprockets 52 and 53 suitably mounted upon shaft 30. Therefore, sprockets 46 through 53 rotate at the same velocity as shaft 36. Said sprockets 46 through 53 carry and drive the two sandwich conveyors 55 and 56 traveling close to the side walls of the machine and will be referred to herein as the outer sandwich carrying conveyors. Two sprockets 57 and 58 are rigidly mounted upon the shaft 36 at one side and adjacent the center line of the machine. Two sprockets 59 and 60 are rigidly mounted upon shaft 36 at the opposite side of the center line of the machine from said sprockets 57 and 58. Said sprockets 57 through 60 rotate at the same velocity as shaft 36 and said sprockets 46, 47, 50 and 51 provide suitable driving means for the inner conveyors 25 and 25' trained to travel over both machines and provide two continuous sandwich conveyors, extending from the entrance end of the cooky sandwich assembly machine 21 to the stackers 77 and 78 maintained upon shaft 68 at the exit end of the counting and dividing machine 20. Shaft 68 is journaled in bearings 70 and 71 mounted upon the side frame near the top of the machine 20, said shaft 68 extending across the machine and parallel with shaft 36. A sprocket 73 is rigidly mounted upon shaft 68 at the far side of the machine. A sprocket 74 is rigidly mounted upon shaft 36 adjacent sprocket 38, said sprocket 74 driving sprocket 73 through the intermediation of a chain 75 trained over said sprockets 73 and 74. Therefore, shaft 68 and the four stackers 76, 77, 78 and 79 mounted thereon, one stacker for each line of sandwiches, are rotated by shaft 36 due to chain 75 and sprockets 73 and 74. Said stacker 76 is in direct alignment with and adjacent the end of said traveling outer conveyor 55. Said stacker 79 is in direct alignment with and adjacent the end of said traveling outer conveyor 56. Stackers 77, 78 are in line with and at the exit end of the inner chain conveyors 25 and 25' respectively.

Figure 3:
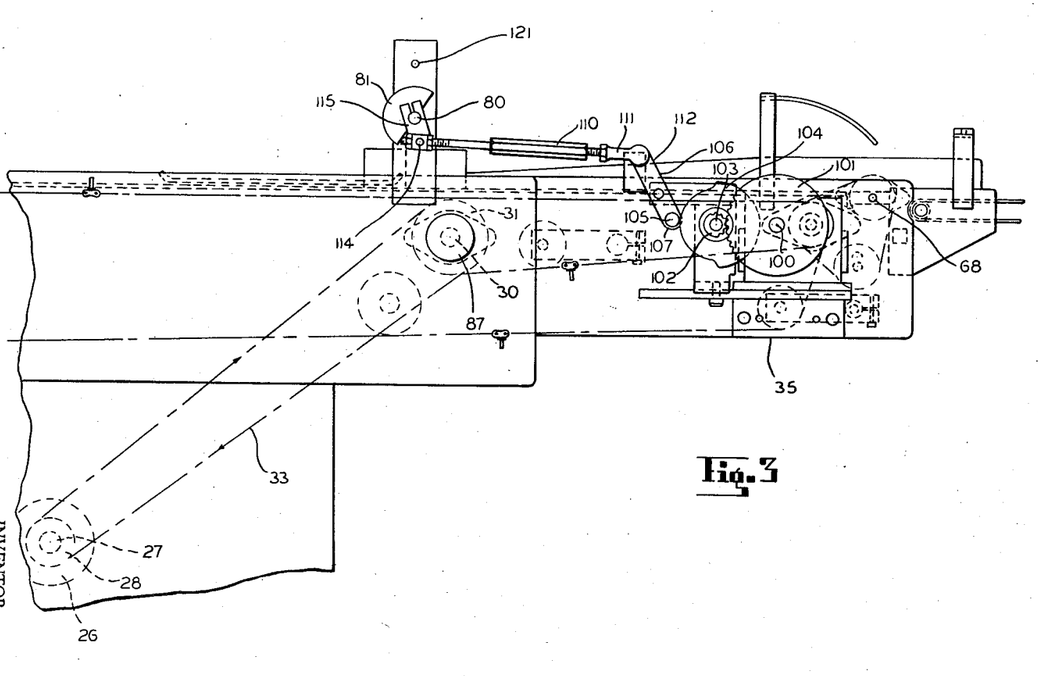
Figure 3 is a fragmentary side elevational diagrammatic view of the machine shown in Figure 2.
Figure 4:
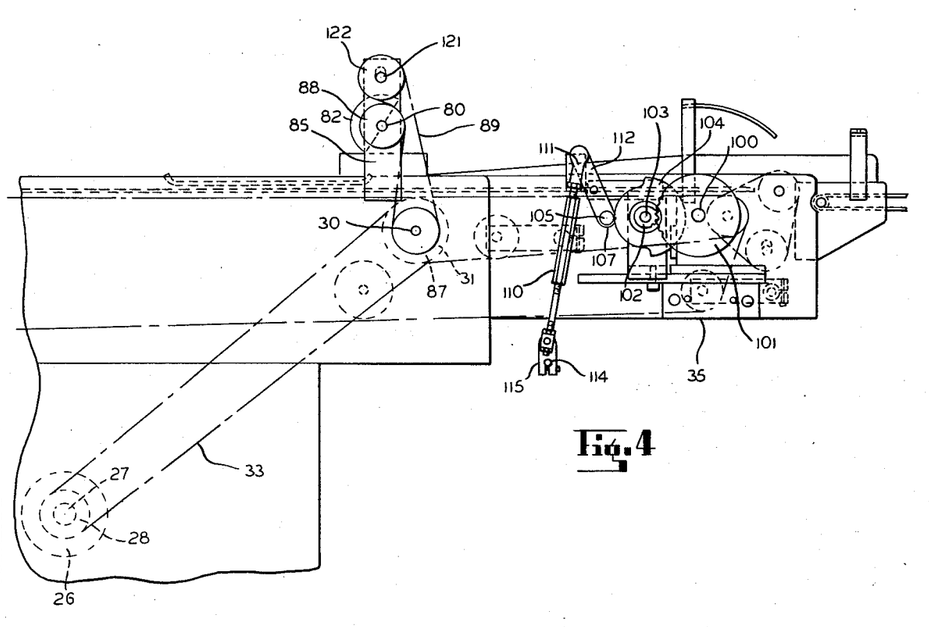
Figure 4 is a view similar to Figure 3 with the connecting rod dismounted and an auxiliary chain assembled with suitable sprockets.

A shaft 80 is journaled in bearings carried by two side brackets 85 and 86 clearly shown by Figures 3 and 4. A sprocket 87 is mounted upon the free end of shaft 30, opposite to the end with the sprockets 31 and 39a mounted thereon. A sprocket 88 is mounted upon the end of shaft 80 adjacent said shaft 30, above and in alignment with sprocket 87. An auxiliary chain 89 is assembled about sprockets 87 and 122 when it is so desired to drive sprocket 88 as shown by Figure 4; its use to be explained later. Two segment deflector control cams 81 and 82 of semi-circular configuration are suitably located upon shaft 80 near the mid section thereof. The cams 81 and 82 are arranged upon shaft 80, the sides thereof are parallel with and the periphery of cam 81 is in exact horizontal alignment with the periphery of cam 82, and are separated a distance slightly less than the distance between the inner conveyor chain 25 and 25'.

Adjacent the chain conveyors carrying the sandwiches are provided suitable side or guide rails. An outside guide rail 90 extends along the chain conveyor 25 and terminates at a point located below said shaft 80. An outside guide rail 91 extends along the chain conveyor 25' and terminates at a point located below said shaft 80. Inner side guide rail 92 and 93 extend along said chain conveyors 25 and 25' and extend beyond the stackers 77 and 78 at the exit end of the machine 20. Dual type guide rails 94 and 95 are removably mounted between the inner and outer chain conveyors, starting at a point some distance from the termination of rails 90 and 91 thereby leaving a plurality of transfer paths 96 and 97 upon surface plates 98 and 99 located between the inner and outer conveyors for slidably supporting sandwiches which are to be transferred from the inner conveyors to the outer conveyors.

The counting gear reducing unit 45 in a suitable housing is suitably connected with one end of shaft 36 to drive the input shaft 107 thereof. The output shaft 100 of said unit 45 supports a spur gear 101 upon its free end, said gear 101 is generally a standard gear with a desirable number of teeth, as for example as shown the gear embodies 100 teeth. Said gear 101 is a driving gear and registers with a pinion type change gear 102 supported upon the end of a shaft 103 suitably journaled and supported upon a base plate 108 secured to the side frames of the counting machine 20. The change gear 102 is shown by the drawing as having 16 teeth. A cam 104 is mounted upon the opposite end of the shaft 103 for driving a cam follower 105 rotatably mounted upon the lower end 107 of a crank arm 106. Said crank arm 106 is pivotally mounted intermediate its ends by suitable means associated with said base plate 108. An adjustable connecting rod 110 is provided and pivotally connected at one end 111 to the upper end 112 of said crank arm 106. The opposite end 114 of said rod 110 is pivotally connected to a crank arm 115 secured to the free end of shaft 80. Therefore, the rotation of gears 101 and 102 will effect rotation of cam 104, the oscillating movement of cam follower 105, arm 106, rod 110, crank arm 115 and shaft 80.

Therefore, when shaft 80 is oscillated a suitable number of degrees, said cams 81 and 82 will be oscillated for the same degree of movement. If and when the shaft 80 is rotated, said cams 81 and 82 will be rotated therewith. When it is desired to continuously rotate said shaft 80, the crank arm 115 is disconnected from the end of the shaft 80 as shown by Figure 4. The sprocket 88 is assembled to the end of shaft 80 in the place normally occupied by said crank arm 115. Directly above the shaft 80 and sprocket 87 is suitably mounted a stub shaft 121 for the reception of the aforementioned sprocket 122 and suitable bearings associated therewith. The chain 89 is trained around sprockets 87 and 122 and in side engagement with the sprocket 88. Said stub shaft 121 may be raised or lowered to adjust the slack of said chain 89. By continuous rotation of shaft 80 the cams are continousuly rotated and the cooky sandwiches on conveyors 25 and 25' will be alternately distributed, one cooky sandwich on each conveyor will continue to travel to the stackers 77 and 78 and every other cooky sandwich on said conveyors 25 and 25' will be deflected to the outer conveyors 55 and 56 and will be carried thereby to stackers 76 and 79. Method and means for deflecting the sandwiches will be explained later.

The dividing and counting machine 20 has been described above as means to provide two methods of sorting cooky sandwiches. The first method allows a number of cooky sandwiches to be carried in a continuous manner by the inner chain conveyors, then the same number of cooky sandwiches are caused to be deflected from each of the inner chain conveyors to the outer conveyors, as for example 16 cooky sandwiches will be carried by each of the chain conveyors 25 and 25' to the stacker 77 and 78; the next 16 cooky sandwiches will be deflected to the outer conveyors 55 and 56 where they will be carried to stackers 76 and 79. This method is effected through the use of the connecting rod 110 having one end assembled to the crank arm 115 assembled upon shaft 80 and with the opposite end assembled with the upper end 112 of arm 106.

The second method is effected by removing the crank arm 115 from shaft 80 and placing a sprocket 87 in its place upon shaft 30, and assemblying the chain 89 about said sprockets 87 and 122. The chain will contact sprockets 88 upon shaft 80 and causes the shaft 80 and deflecting cams 81 and 82 to rotate continuously thereby effecting alternate cookies carried by the chain conveyors 25 and 25' to be deflected to the outer conveyors 55 and 56 where they will travel to stackers 76 and 79, resulting in four continuous single stacks of sandwiches. The means for deflecting the cooky sandwiches will now be described.

A tie bar 125 is assembled to the frame work of the counting machine 20. Said tie bar is arranged transversely of the machine below the conveyors and ahead of drive shaft 30. Attached to the tie bar is secured a lower bracket 126 with a channel shaped base portion. An angular shaped bottom bracket 127 with a longitudinal slot is slidably mounted upon said lower bracket 126 for holding the deflecting springs or spring members. Said brackets are arranged longitudinally of the machine. The angular bracket is adjustably mounted upon the lower bracket by a bolt 128 extending through the slot 132 of bracket 127 and secured in threaded bore 129 in the lower bracket 126.

Figure 12:
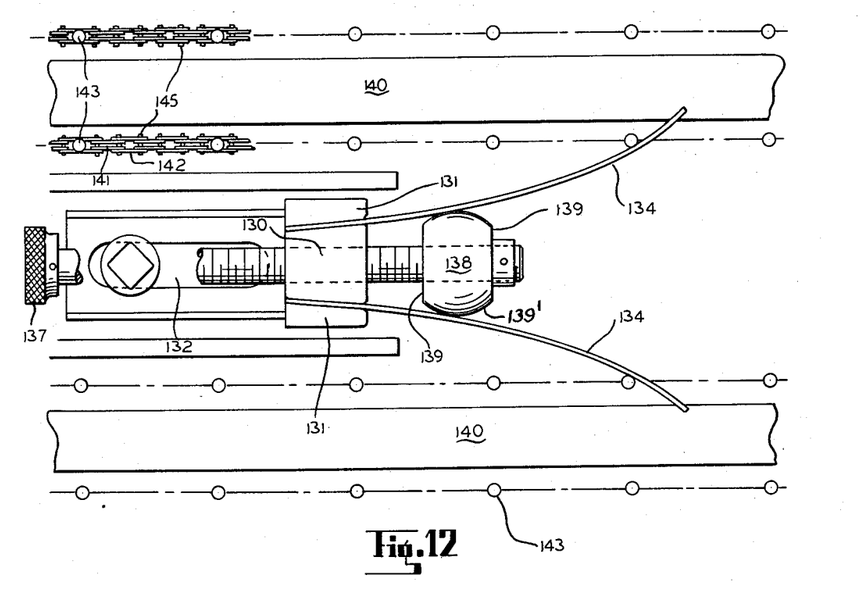
Figure 12 is a fragmentary diagrammatic plan view showing specifically the leaf springs supporting member and means for adjusting the relative position of the same.
Figure 13:
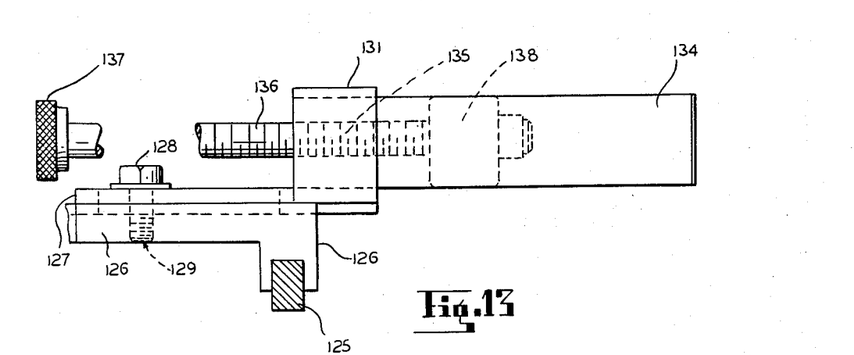
Figure 13 is a fragmentary diagrammatic side elevational view of the supporting member shown by Figure 12.

The angular bracket 127 has an upwardly extending support 130, the vertical side walls of said support 130 converging inwardly towards the rear end thereof providing a trapezoidal cross-section with parallel front and rear walls. The center line of the slot 132 passes through the center line of the support 130. Spring clamps 131 of rectangular configuration and of wedge shape cross-section are bolted to both of the angular side walls of said support 130. A pair of flat resilient spring steel members 134 of rectangular configuration are vertically assembled with their rear ends thereof clamped between said support 130 and the spring clamps 131 whereby the free ends of said spring members 134 will extend outwardly with considerable distance therebetween. The upwardly extending support 130 is provided with a threaded bore 135 extending horizontally therethrough. A threaded brass rod 136 is assembled in said threaded bore 135 with an adjusting hand nut 137 secured upon the rear end of said rod 136. A chrome plated spring adjusting block 138 with flat vertical front and rear walls 139 and convex side walls 139' is provided with a smooth cylindrical bore and is rotatably assembled upon the forward end of said rod 136. Said block 138 therefore is located between said free ends of the forward extending springs or spring members 134. When it is desired to increase the distance between the free ends of said spring members 134 the adjusting nut 137 is turned in a counterclockwise direction when viewing the rear end thereof, said movement will turn said rod 136 therewith since they are rigidly assembled together, and the adjusting block will be moved rearwardly. The rearward movement of said block 138 causes the convex sides 139' thereof to contact said springs 134 spreading the free ends thereof as desired. By turning the adjusting nut 137 in a clockwise direction said block 138 will be moved away from said support 130, the outward movement of said block 138 will relieve the contact pressure upon the spring members 134 and the free ends of spring members will move closer together, in this design they will no longer contact the vertical pins of the chain conveyor as they are passing adjacent thereto.

Figure 5:
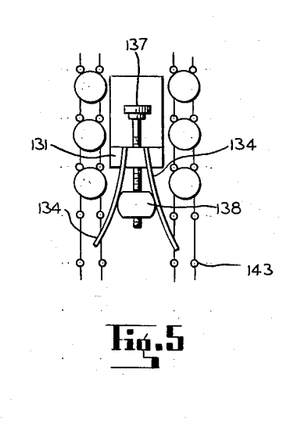
Figure 5 is a fragmentary diagrammatic plan view showing a pair of leaf springs extending outwardly above the conveyors.
Figure 6:
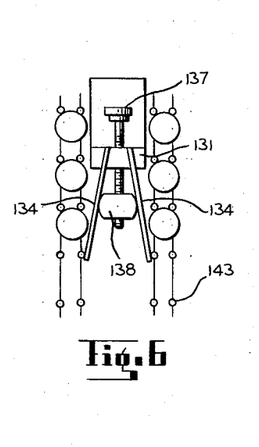
Figure 6 is a fragmentary diagrammatic plan view similar to Figure 5 showing the leaf springs retracted and in contact with upstanding pins assembled with and forming a part of the moving conveyors.
Figure 7:
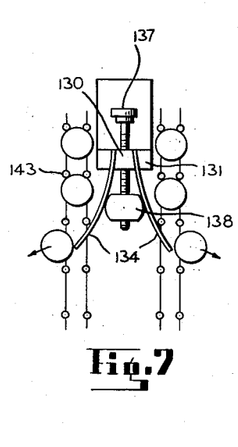
Figure 7 is a fragmentary diagrammatic plan view similar to Figures 5 and 6 but showing the springs released from and in a location between the upstanding pins of the chain conveyor.
Figure 8:
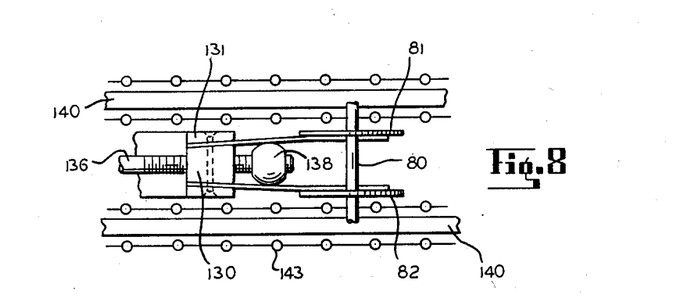
Figure 8 is a fragmentary diagrammatic plan view showing the leaf springs restrained by cam members for preventing their contact with the upstanding pins of the chain conveyor.

The cooky sandwich conveyor chains for moving the sandwiches along on the smooth conveyor strips 140 are constructed with horizontally arranged rollers 141 and links 142 secured together by suitable chain rivets 145 arranged with designated rollers on opposite sides of the conveyor strip and in alignment therewith, as for example every eighth roller on opposite sides of the strips, a vertical pin 143 is assembled at the outer end of the roller so it will extend upwardly therefrom and become the means for moving cooky sandwiches upon the conveyor strips 140. Said pins 143 are of sufficient height that they will strike and move any spring member 134 extending into its normal path of travel. When a plurality of sandwiches are being conveyed by the pins assembled with the two cooky sandwich chain conveyors 25 and 25' on opposite sides of the two conveyor strips 140 associated therewith, and the two spring members 134 are supported between the conveyors 25 and 25' the free ends of the spring members 134 will extend normally, partially across the path of travel of the sandwiches and conveyor chain pins as shown by Figure 5. The vertical pins assembled on the inner side of the conveyor chains 25 and 25' will contact both the spring members and move them toward the center line of the machine, or closer to each other, under tension as shown by Figure 6. As the pins continue to travel toward the discharge end of the machine, the springs will no longer be held away from their normal position by the pins and they will return to their normal location across the conveyor strips 140 with a snap type reaction. If cooky sandwiches are being conveyed by the vertical pins following the first set of pins on said conveyor chains, the cooky sandwiches conveyed by chain 25 will be deflected by the snap action of one of the spring members to the conveyor strip between chains 55, the cooky sandwich conveyed by the following set of pins on conveyor chain 25' will be deflected by the second spring member to the conveyor strip between chains 56, said chains 55 and 56 forming the outer conveyors.

The above stated action of deflecting the cooky sandwiches from chains 25 and 25' to chains 55 and 56 only takes place when the spring member are uncontrolled by the segmental cams 81 and 82. The means for oscillating, or rotating, shaft 80 has been described above. The arrangement of the cams 81 and 82 upon shaft 80 is clearly shown by Figures 8, 9, 10 and 11.

Figure 9:
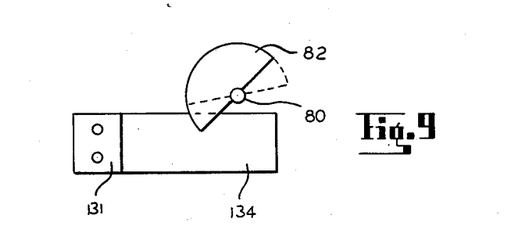
Figure 9 is a fragmentary diagrammatic side view of the parts shown in Figure 8.
Figure 10:
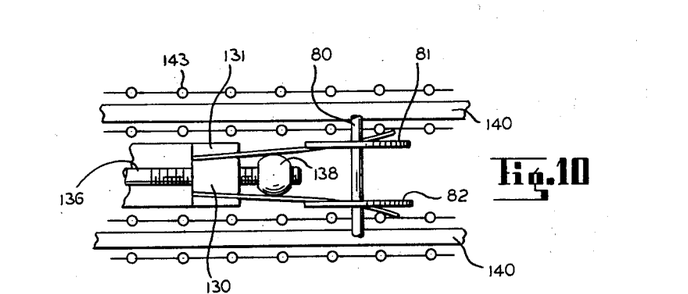
Figure 10 is a fragmentary diagrammatic plan view similar to Figure 8 but with the leaf springs extended above the chain conveyors.
Figure 11:
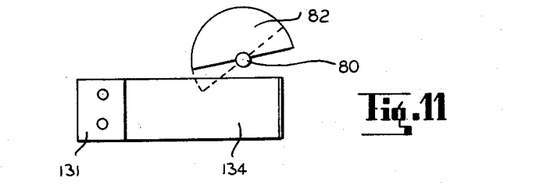
Figure 11 is a fragmentary diagrammatic side view of the parts shown in Figure 10.

When it is desired to direct the cooky sandwiches in equal numbers continuously from two rows into four rows, the shaft 80 is rotated continuously whereby the cams 81 and 82 will rotate continuously. The vertical pins of conveyor chains 25 and 25' will move the spring members 134 toward each other in the usual manner, the segment cams will turn downwardly between the spring members and the conveyor chains 25 and 25' as shown by Figure 9 and hold the spring members in restrained position for one-half revolution of shaft 80; and during this time interval, the following two sandwiches are not deflected from their paths on chains 25 and 25', and will continue thereon to the exit end of the machine. During the time interval, the segment cams are above the spring members and not in contact therewith, the vertical pins will control the action of the spring members; said spring members deflecting the following two sandwiches after the cams are in elevated location. Therefore, by continuous rotation of the shaft 80 and the cams 81 and 82, every other sandwich on each of the chains 25 and 25' will be deflected to the outside conveyor chains, resulting in the establishment of four continuous stacks of sandwiches on the discharge belt beyond the stackers 76, 77, 78 and 79.

When its is desired to direct the cooky sandwiches into groups of equal numbers upon the four conveyor strips to the stackers, as for example where sixteen sandwiches are allowed to pass on each of the conveyor chains 25 and 25' and then sixteen sandwiches are desired upon each of the conveyor chains 55 and 56, the shaft 80 is oscillated by the gear reducing unit 45 in connection with the connecting rod 110. The cams 81 and 82 are oscillated slowly as controlled by the number of teeth in the driving gear 101 and the change gear 102. The cams will be lowered to hold the spring members 134 away from the conveyor pins preventing the spring members from deflecting any of the cooky sandwiches from the chains 25 and 25'. As soon as the cams are raised above the spring members, by the reducing unit 45, and the cams continue their slow oscillating movement, the following group of cookies on each of the conveyor chains 25 and 25' will all be deflected to the outer conveyor chains 55 and 56. Therefore, a group of sandwiches on each of the conveyor chains 25 and 25' will pass to stackers 77 and 78, then a group of sandwiches will pass along on each of the conveyor chains 55 and 56 to stackers 76 and 79. It is clearly seen that desired number of sandwiches in each group is controlled by the gear ratio between gears 101 and 102. Gear 101 usually has 100 teeth and drives the change gear 102 of any desired number of teeth. When it is desired to have sixteen sandwiches in a group, there will be thirty-two sandwiches on the combined two center conveyor chains, or thirty-two on the combined two outer conveyor chains. The output shaft 100 of the reducing unit 45 revolves but 1/50 revolution for each revolution of the drive shaft 68. Then when the user desires but one revolution of the cam shaft for thirty-two sandwiches, the number of teeth needed in the change gear will be sixteen; that is, divide the number of sandwiches desired conveyed by the two chains by numeral two and you have the number of teeth in the change gear. Should we only desire a total of sixteen sandwiches to be conveyed the operator would use a change gear of eight teeth.

The sandwiches are conveyed as flat objects to the stackers 76, 77, 78 and 79. It is desirable to deliver the sandwiches upon the usual belt conveyor in vertical or shingle formation.

Each stacker is composed of a cylindrical hub portion embodying a longitudinal bore. The hubs have two paddle members integrally formed therewith and extending outwardly from two opposite sides thereof. The end portions of the paddle members have added outward-extending rim portions embodied therewith; the forwardly extending paddles have said extended rim portions on the bottom side thereof, the rearwardly extending paddles have said extended rim portions on the upper side thereof. The cooky sandwiches are carried upon the stackers, the raised rear end portion of the stackers holding the sandwiches thereon. As the stacker shaft is rotated, the sandwiches are turned substantially 180° by the overturning paddle members and deposited upon the traveling belt for stacking and packaging. In order to keep the sandwiches upon the paddle members as they are being rotated, a plurality of flexible leather strips are secured to a suitable bracket mounted upon the machine, one leather strip for each stacker and mounted above the same, the strips extending rearwardly and downwardly whereby the end portions thereof will come into sliding contact with the edge portions of the sandwiches, holding same in the desired position.

Summarizing the operation of the cooky sandwich dividing, counting and grouping machine assembled to a cooky sandwich assembly machine, in its entirety, assuming the magazines are filled with the desired cookies out of which the sandwiches are to be made and assuming further that the hopper contains a sufficient amount of crème, the sandwiches are formed and are carried forward by two conveyor chains 25 and 25' onto the dividing and counting machine 20. As the chains 25 and 25' pass the counting and spring deflecting unit arranged therebetween the sandwiches are arranged in groups, a certain number of sandwiches conveyed straight through the machine by the chains 25 and 25' and then the same number of sandwiches are deflected to the outer conveyors 55 and 56, this method being repeated in due form as long as the spring controlling cams are oscillated by means of the connecting rod and reducing gear unit. If the connecting rod is removed and a chain is applied to the controlling cam shaft and a driving sprocket, the cam shaft rotates continuously and the spring members deflect every other cooky sandwich to the outer conveyors, forming four continuous rows of cookies, the cookies suitably spaced apart from each other. By either method, the cooky sandwiches are conveyed to the stackers and carefully deposited upon the endless belt for conveyance to locations for packaging the sandwiches.

While the description of this invention has been primarily directed to the dividing and grouping of cooky sandwiches, it is to be understood that this machine can be used equally as well for the dividing and grouping of wafers or other similar flat objects.

Although the foregoing description is necessarily of a detailed character, in order to define the structure, function and advantages of the invention it is to be understood that the specific terminology is not intended to be restricted or confining and that various rearrangements of the parts and alternate combinations of elements may be resorted to without departing from the scope or spirit of the invention.

I claim as my invention:

1. A cooky sandwich machine comprising a main conveyor, a secondary conveyor, means for moving said main conveyor and said secondary conveyor in predetermined spaced axial relationship, a spring member having one end mounted on said machine in fixed relation thereto and another end extending above and across the path of said main conveyor, means for periodically actuating said spring member as said main conveyor moves and carried by said main conveyor and means for transmitting cookies from said main conveyor to said secondary conveyor in response to said periodic movement of said spring member.

2. A cooky sandwich machine comprising a main conveyor, a secondary conveyor, means for moving said main conveyor and said secondary conveyor in predetermined spaced axial relationship, a spring member having one end mounted on said machine in fixed relation thereto and another end extending above and across the path of said main conveyor, means for periodically actuating said spring member as said main conveyor moves and carried by said main conveyor, means for transmitting cookies from said main conveyor to said secondary conveyor in in response to said periodic movement of said spring member, and wedge means for adjusting the angle of said spring relative to said main conveyor.

3. An automatic control mechanism for cooky sandwich conveyors comprising a pair of main conveyors, a pair of secondary conveyors, said main conveyors and said secondary conveyors being aligned in predetermined spaced axial relationship, spring members having inner ends fixedly secured to said mechanism and outer ends extending in overlying relationship to said main conveyors, means carried by said main conveyors for periodically actuating said spring members overlying said main conveyors to occasion a snap action thereof, and means for transmitting cookies carried by said main conveyors to said secondary conveyors in response to said snap action of said spring members.

4. An automatic control mechanism for cooky sandwish conveyors comprising a pair of main conveyors, a pair of secondary conveyors, said main conveyors and said secondary conveyors being aligned in predetermined spaced axial relationship, spring members having inner ends fixedly secured to said mechanism and outer ends extending in overlying relationship to said main conveyors, means carried by said main conveyors for periodically actuating said spring members overlying said main conveyors to occasion a snap action thereof, means for transmitting cookies carried by said main conveyors to said secondary conveyors in response to said snap action of said spring members, a wedge shaped member and a support base on said mechanism threadedly engaging said wedge shaped member affording manual adjustment of the angle of deflection of said spring members extending in said overlying relationship to said main conveyors.

5. A cooky sandwich machine comprising a main conveyor, a secondary conveyor, means for moving said main conveyor and said secondary conveyor in predetermined spaced axial relationship, a spring member having one end mounted on said machine in fixed relation thereto and another end extending above and across the path of said main conveyor, means for periodically actuating said spring member as said main conveyor moves and carried by said main conveyor, means for transmitting cookies from said main conveyor to said secondary conveyor in response to said periodic movement of said spring member, and cam means rotatably mounted on said machine driven by said means for moving said main conveyor and said secondary conveyor in synchronization with said main conveyor and said means for periodically actuating said spring means, said cam means being adapted to determine the periodicity of the action of said spring means.

6. A cooky sandwich machine comprising a main conveyor, a secondary conveyor, means for moving said main conveyor and said secondary conveyor in predetermined spaced axial relationship, a spring member having one end mounted on said machine in fixed relation thereto and another end extending above and across the path of said main conveyor, means for periodically actuating said spring member as said main conveyor moves carried by said main conveyor, means for transmitting cookies from said main conveyor to said secondary conveyor in response to said periodic movement of said spring member, cam means rotatably mounted on said machine driven by said means for moving said main conveyor and said secondary conveyor in synchronization with said main conveyor and said means for periodically actuating said spring means, said cam means being adapted to determine the periodicity of the action of said spring means, and a timing device operated by said moving means including a driving shaft having a spur gear thereon, a pinion gear operating in conjunction with said spur gear and means connecting said spur gear and said cam means for operating said cam means.

7. A cooky sandwich machine comprising a main conveyor, a secondary conveyor, means for moving said main conveyor and said secondary conveyor in predetermined spaced axial relationship, a spring member having one end mounted on said machine in fixed relation thereto and another end extending above and across the path of said main conveyor, means for periodically actuating said spring member as said main conveyor moves and carried by said main conveyor, means for transmitting cookies from said main conveyor to said secondary conveyor in response to said periodic movement of said spring member, and cam means rotatably mounted on said machine driven by said means for moving said main conveyor and said secondary conveyor in synchronization with said main conveyor and said means for periodically actuating said spring means carried by said main conveyor, said cam means being adapted to determine the periodicity of the action of said spring means so that alternate articles on each of said main conveyors are allowed to travel along said main conveyors and other articles intermediate of the alternate articles are transmitted along said transmission means to said secondary conveyors.

8. A cooky sandwich machine comprising a main conveyor, a secondary conveyor, means for moving said main conveyor and said secondary conveyor in predetermined spaced axial relationship, a spring member having one end mounted on said machine in fixed relation thereto and another end extending above and across the path of said main conveyor, means for periodically actuating said spring member as said main conveyor moves and carried by said main conveyor, means for transmitting cookies from said main conveyor to said secondary conveyor in response to said periodic movement of said spring member, and cam means rotatably mounted on said machine driven by said means for moving said main conveyor and said secondary conveyor in synchronization with said main conveyor and said means for periodically actuating said spring means carried by said main conveyor, said cam means being adapted to determine the periodicity of the action of said spring means for alternately conveying a row of articles on said main conveyor and deflecting a row of articles from said main conveyor to said secondary conveyor, the gear ratios between said spur gear and said pinion gear directly determining the number of articles in each row.

References Cited in the file of this patent

UNITED STATES PATENTS

| | | |
|---|---|---|
| 1,702,901 | Hungerford | Feb. 19, 1929 |
| 2,451,104 | Lowe | Oct. 12, 1948 |
| 2,602,534 | Hartman | July 8, 1952 |
| 2,645,328 | Winters | July 14, 1953 |